United States Patent [19]

Sciacca et al.

[11] 3,854,799

[45] Dec. 17, 1974

[54] REFLECTING DEVICE CONSTRUCTION

[75] Inventors: Angelo J. Sciacca, Juno; Thomas B. Milam, Jupiter, both of Fla.

[73] Assignee: United Aircraft Corporation, East Hartford, Conn.

[22] Filed: Jan. 26, 1973

[21] Appl. No.: 327,024

[52] U.S. Cl. ................. 350/310, 350/288, 248/475
[51] Int. Cl. ............................................. G02b 5/08
[58] Field of Search .......... 350/310, 288, 287, 305; 248/13, 19, 475 R

[56] References Cited
UNITED STATES PATENTS

| | | | |
|---|---|---|---|
| 1,840,741 | 1/1932 | Reid | 248/19 |
| 2,842,955 | 7/1958 | Pedersen | 248/19 X |
| 3,208,344 | 9/1965 | Staunton | 350/310 |
| 3,328,730 | 9/1970 | Saxon | 350/305 X |
| 3,436,050 | 4/1969 | Tibbals | 350/288 X |
| 3,637,296 | 1/1972 | McLafferty et al. | 350/310 |
| 3,676,274 | 7/1972 | Matulis | 350/310 |
| 3,713,728 | 1/1973 | Austin et al. | 350/310 |

Primary Examiner—Ronald L. Wibert
Assistant Examiner—Michael J. Tokar
Attorney, Agent, or Firm—Jack N. McCarthy

[57] ABSTRACT

The mirror is constructed having a reflecting surface formed on a heat exchanger plate means having a manifold on each end. The free ends of the manifolds are connected by rod members. The plate means is bonded to the top of a rigid backing member and the bottom of the backing member is bonded at three points to a mounting pad member which in turn is mounted to a mount block by an alignment assembly at three locations. Each alignment assembly has interacting spherical and conical shaped members for facilitating installation. The mount block has three locations for receiving said assemblies, one location being rigid while the other two are located on flexible arms permitting a limited amount of movement to prevent an undue force being transmitted between the mount block and the backing member. The mount block is maintained on a foundation by a large bolt through the center thereof.

7 Claims, 7 Drawing Figures

PATENTED DEC 17 1974

REFLECTING DEVICE CONSTRUCTION

The invention herein described was made in the course of or under a contract or subcontract thereunder with the Department of the Air Force.

BACKGROUND OF THE INVENTION

This invention relates to laser mirrors and particularly to those of high-power high-quality.

The output efficiency and quality of high-power laser systems are to a large extent, controlled by the ability of the optical elements in the system to maintain their optical figure and reflectivity. The intensity levels produced in high-power gas dynamic lasers necessitated the development of cooled mirrors.

Beam quality is a measure of the deliverability of the output radiation that can be obtained from any laser system and is a function of the amplitude and phase distribution in the output beam. Of the various factors that limit the obtainable beam quality of a high-power laser, potentially one of the most significant is the distortion of the mirrors used to fold the high-power beam through the optical cavity, transfer the beam from one cavity to the other, and to control and direct the output beam.

Packaging considerations, and the desire to achieve maximum energy extraction from the active medium make a relatively large number of extraction passes in a high-power laser desirable. This increases the number of mirrors required to direct the beam through the cavity. The complex optical systems required to expand, direct, and focus the output radiation further increase the number of mirrors in the optical train. As the number of mirrors is increased, the quality degradation associated with radiation-induced mirror distortion will increase unless the distortion of each mirror in the system can be limited.

The feasibility of using laser systems for various missions is directly related to their ability to deliver high-radiation intensities at relatively long ranges. Since the radiation intensity level is limited by diffraction, these high-delivered intensities can only be achieved by increasing the laser power output or by increasing the size of the output beam-control optics. Both of these techniques require improvements in mirror technology. The mirror disclosed herein is an improvement.

The surface of any mirror has a small, but finite, absorptivity. A small portion of the radiant energy incident upon the mirror surface is, therefore, absorbed as thermal energy. This evergy absorption and its subsequent removal by the coolant induces a thermal distortion of the mirror surface. The distortion of the mirror surface means that different portions of the beam travel slightly greater distances between the mirror surface and some reference plane.

In addition, these directional changes cause the beam to intercept the other mirrors in the optical system at different relative positions on the mirror surfaces and at different relative angles. This multireflection mirror-train effect tends to magnify the directional errors induced by the mirror surface distortions. The amount of this magnification of directional error and the associated phase variation is a function of the mirror surface contour distortion and the number, the relative position, and the orientation of all the mirrors in the optical train.

Two cooled reflecting devices are shown in U.S. Pat. Nos. 3,637,296 and 3,645,608.

SUMMARY OF THE INVENTION

A primary object of the present invention is to produce a high-power high-quality laser mirror.

In accordance with the present invention a mirror is formed having a reflecting surface formed on a heat exchanger plate means with manifolds extending therefrom at each end. Said exchanger plate being bonded to a backing plate with the manifolds spaced therefrom and with rod means connecting the free ends of the manifolds.

Further in accordance with the present invention, a mounting pad member is provided for receiving the back of said backing member, said mounting pad member having three pads which are bonded to the backing member with connecting web-like members properly locating the three mounting pads. These webs provide a degree of flexibility permitting differences in thermal growth between said backing member and the mounting pad member without transferring an excess force therebetween.

In accordance with an aspect of the present invention, a mount block is provided having three locations for receiving three mounting projections on said mounting pad member. Said mounting block having one fixed location and two movable locations which are positioned on arms which will permit bending, this will prevent a transfer of excess force between the mounting block and mounting pad member into said backing member.

In accordance with a further aspect of the present invention, the rods fixing the free ends of the manifolds together reduce any bending moments where the heat exchanger plate means is bonded to the backing member.

An object of this invention is to isolate the backing member from external loads, therefore the coupling adapters are to be fittings which will prevent assembly loads from being transmitted to the backing member.

DESCRIPTION OF THE PREFERRED EMBODIMENTS

Figure 1:
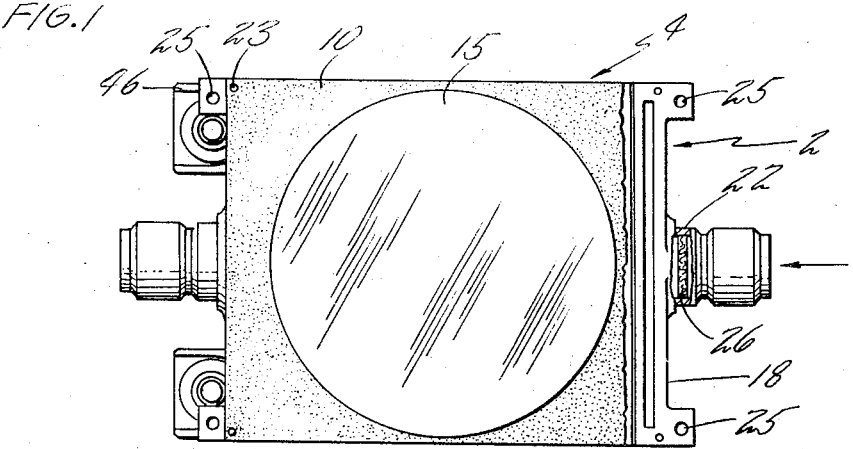
FIG. 1 is a top view of a cooled reflecting device constructed in accordance with the present invention.

The reflecting device 2 comprises three main parts: Part (1) includes the cooled reflecting surface on a heat exchanger plate means with coolant manifolding 4, Part (2) includes the backing member 6, and Part (3) includes the mounting means 8. Part (1) is formed having a metallic face plate 10 fixed to a metallic closure plate 12. The face plate 10 has a plurality of grooves 14 extending along the inner surface thereof and has a reflecting surface 15 formed on the outer surface thereof. The closure plate 12 has a slot 16 along each end which connects the ends of the grooves 14. When the closure plate 12 is placed against the side of the face plate 10 having the groove 14, passages 17 are formed.

An inlet manifold 18 is attached to one end of the closure plate 12 enclosing the slot 16, and an outlet manifold 20 is attached to the other end of the closure plate 12 enclosing the other slot 16. Each inlet and outlet manifold, 18 and 20, extends away from the closure plate with the ends being connected by rods 29 in a manner to be hereinafter described. Each inlet and outlet manifold has a tubular projection 22 extending therefrom for directing a coolant flow into and out of the respective manifolds, coupling adapters can be fixed to said tubular projections 22 for attachment respectively to a coolant supply and discharge area. This adapter is preferably a fitting which would not place a torque on the tubular projection 22. The tubular projection 22 for inlet manifold 18 contains a filter 26 to prevent clogging of the passages 17.

In operation a coolant enters the inlet manifold 18 through the filter 26 from a coolant supply and passes upwardly through slot 16 to one end of the passages 17. The flow then follows the passages 17 to the slot 16 on the opposite side and flows down into the outlet manifold 20 and thereon to a discharge area.

The face plate 10 is brazed to closure plate 12 forming a heat exchanger plate means with passages 17, and then the inlet manifold 18 and outlet manifold 20 are brazed to their respective ends of the heat exchanger plate means enclosing the slots 16, thereby forming a device wherein coolant can enter the inlet manifold, pass through the heat exchanger plate means, and exit out of the outlet manifold.

The top of each of the inlet and outlet manifolds 18 and 20 have a pair of openings at each end thereof. The larger opening 25 is threaded and receives bolts which hold down a cover plate (not shown) which protects the reflecting surface 15. The smaller opening has a pin 21 extending therefrom which aligns with openings 23 through the face plate 10 and closure plate 12 to properly position the inlet and outlet manifolds and plates for brazing.

Copending application Ser. No. 326,913 filed concurrently herewith, to Dye et al., discloses details of a reflecting device having a similar construction of Parts (1) and (2).

Figure 2:
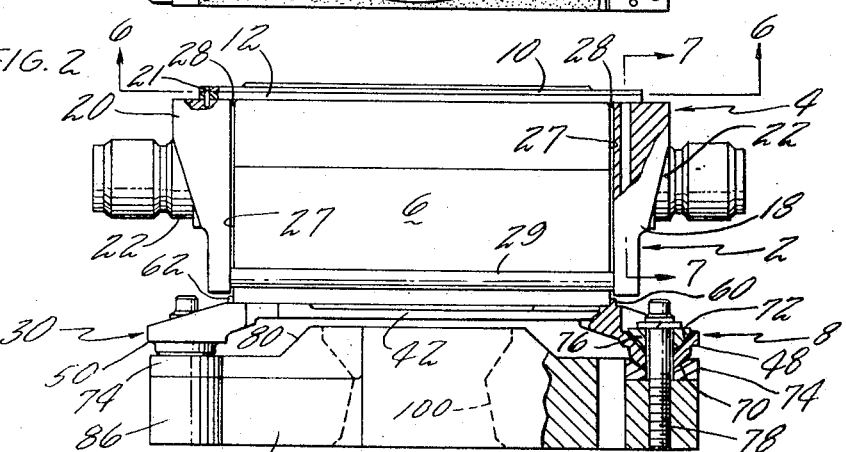
FIG. 2 is a side view of the cooled reflecting device shown in FIG. 1.
Figure 3:
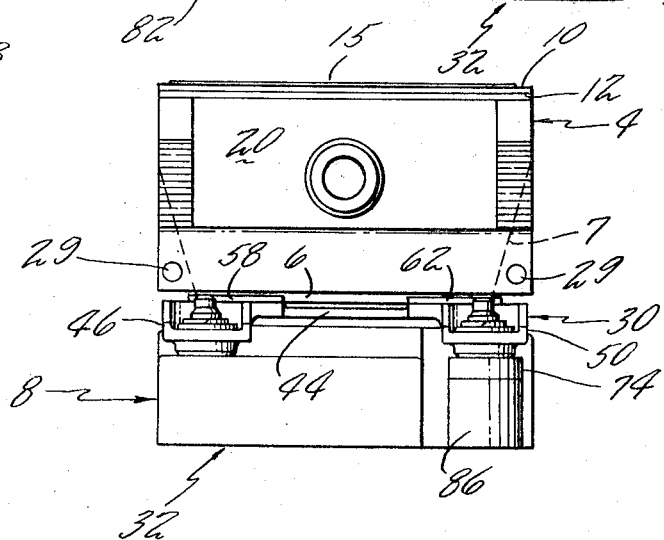
FIG. 3 is an end view taken from the left of FIG. 2.
Figure 4:
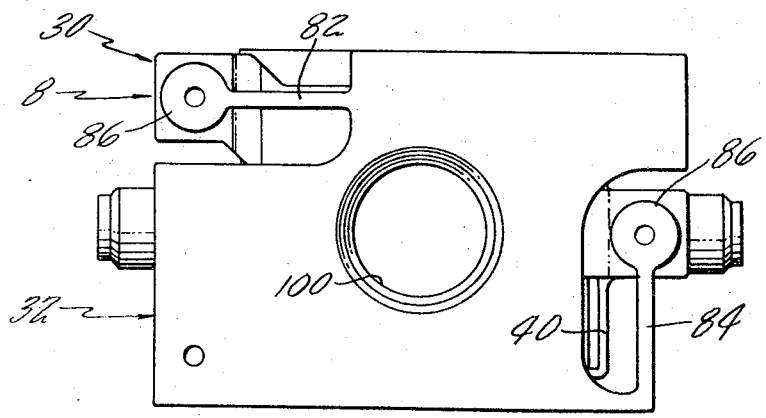
FIG. 4 is a bottom view of the cooled reflecting device shown in FIG. 1.

The backing member 6 is formed as a relatively thick block having a top surface onto which the bottom of closure plate 12 is bonded and a bottom surface which is bonded to a mounting pad member 30. A mounting pad member 30 is in turn fixedly mounted to a mount block 32. Mount block 32 can be mounted to a foundation member by any means desired. In FIG. 2 a contoured opening 100 is shown through the mount block 32 which receives a large bolt for fixedly mounting it to a foundation member. The backing member 6 has its top portion formed substantially rectangular and it extends for substantially the width of the heat exchanger element, which is the width of the plates 10 and 12 and its length is such that when it is positioned between the inner ends, or surfaces, 27 of the inlet and outlet manifolds 18 and 20, a space 28 is provided. As mentioned hereinbefore, the free ends of the inlet manifolds 18 and 20 are connected by rods 29, which extend on either side of the backing member 6. These rods position these ends of the inlet and outlet manifolds and provide the required support at this location of Part (1), reducing the bending moments at the bonded joint between the top surface of backing member 6 and the bottom of closure plate 12. The backing member 6 tapers inwardly from its upper rectangular shape on the two sides as shown at 7. This taper places the lower part of the backing member within the rods 29. The ends of the rods 29 are bonded into holes positioned in the bottom of the inlet and outlet manifolds 18 and 20.

Figure 5:
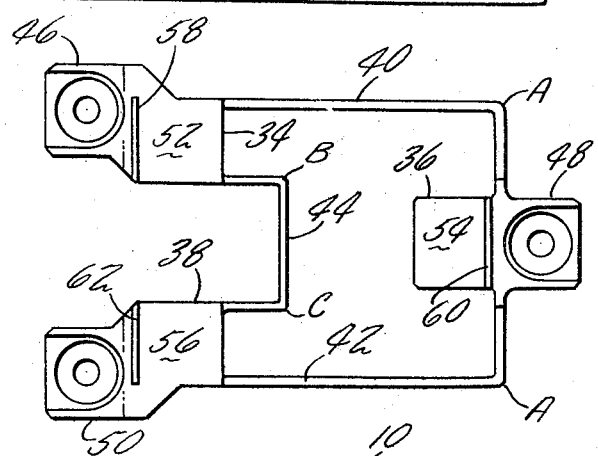
FIG. 5 is a top view of the mounting pad member.
Figure 6:
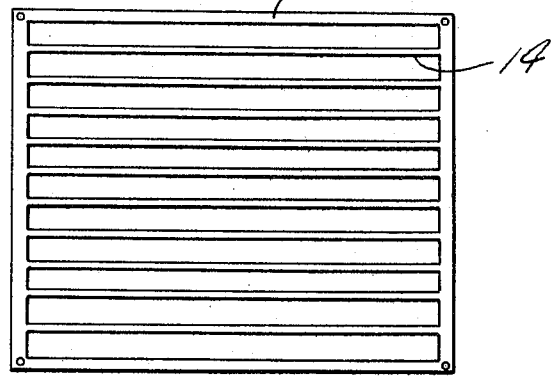
FIG. 6 is a view taken along the line 6—6 of FIG. 2.
Figure 7:
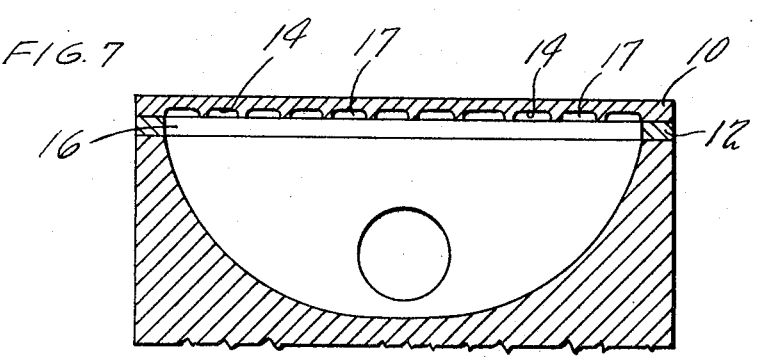
FIG. 7 is a view taken along the line 7—7 of FIG. 2.

As stated hereinbefore, the bottom surface of the backing member 6 is bonded to a mounting pad member 30. The mounting pad member 30 (see FIG. 5) is formed having three mounting pads 34, 36 and 38 properly positioned and held in place by interconnecting web-like members 40, 42 and 44. The mounting pads are positioned with two pads 34 and 38 on one end of the mounting pad member spaced to contact one end of the backing member 6 at two corners and with one pad 36 on the other end of the mounting pad member located to contact the other end of the backing member at its center. The mounting pad member 30 also has three mounting projections 46, 48 and 50, in turn properly positioned. These projections extend outwardly from each end of the mounting pad member 30 adjacent an end of each pad 34, 36 and 38, respectively. The mounting pads 34, 36 and 38 each have top outwardly facing mounting surfaces 52, 54 and 56, respectively, on which the bottom surface of the backing member 6 is bonded. The ends of the backing member 6 are positioned within flanges 58, 60 and 62 located on the outside of the mounting pads 34, 36 and 38, respectively (see FIG. 2). The web-like members 40, 42 and 44 extend between the mounting pads 34, 36 and 38 with their top surfaces below the mounting surfaces 52, 54 and 56 of the mounting pads. Web-like member 40 extends from a point adjacent the outer free corner of mounting pad 34 to a point adjacent the meeting point of the mounting pad 36 and projection 48 and has an angular bend A therein to accommodate thermal movement.

Web-like member 42 is formed in the same manner between mounting pad 38 and the other side of mounting pad 36 and projection 48. Web-like member 44 extends between a point adjacent each inner free corner of mounting pads 34 and 38 forming two angular bends B and C.

The mounting projections 46, 48 and 50 extend in a direction away from the backing member 6. Each projection is formed having an external portion 70 shaped as a portion of a sphere. The interior of said projection has an internal surface 72 formed as a portion of a cone. Each of the external spherical surfaces 70 are positioned in a mating conical seat on the mount block 32 for proper positioning thereon. One of the conical seats is fixedly positioned on the block while two are located on washers 74 in a manner to be hereinafter described.

A washer 76 having one flat surface with the other surface being shaped as a portion of a sphere, is positioned with its spherical surface contacting the internal surface 72 of each projection while a bolt 78 extends through each assembly to fixedly mount it on the mount block 32. The opening in the center of the washer is made larger than the stem of the bolts to provide for variation in alignment. The opening in the projections 46, 48 and 50 and a washer 74, when used, also have the opening therethrough made enlarged as the opening in the washer. This permits variation in alignment of the mounting projections on the mount block 32.

The mount block 32 is formed basically rectangular in shape with a thick middle portion 80 extending under the backing member 6. Two conical seats are mounted on one end of the mount block at the corners thereof while one conical seat is located at the other end at the center thereof. One of the conical seats is mounted on a solid corner of the block while the other two conical seats, the one at the other corner and the one in the center of the block on the other end are mounted on arms 82 and 84, respectively, which have been formed integral with the block with material being cut away therearound. Each arm has a large cylindrical member 86 at the free end thereof which is made shorter than the thickness of the block at its ends to accommodate the extra washer 74.

In one reflecting device designed, the face plate 10 and closure plate 12 were molybdenum, with the plates being brazed together. The manifolds 18 and 20, also molybdenum, were then brazed to the bottom of closure plate 12. The backing member 6 was formed from a glass, or vitreous, ceramic substrate, CER-VIT$_R$ being used. The reflecting surface 15 was formed by a gold-chrome coating. The bottom of the closure plate 12 (molybdenum) was bonded by an epoxy to the top of the backing member 6 (CER-VIT$_R$ C–101). The bottom of the backing member 6 was bonded by an epoxy to the three mounting surfaces 52, 54 and 56 of the mounting pads 34, 36 and 38. The epoxy used above was Eccobond 51. The mounting pad member 30 was stainless steel as was the mount block 32.

In the designed reflecting device the arms 82 and 84 were designed to limit the maximum force on the backing member 6 of CER-VIT$_R$ C–101 to 50 pounds due to thermal movements of the mount block 32 and the web-like members were designed to properly position the mounting pads 34, 36 and 38 and the projections 46, 48 and 50 at assembly temperature and to move under thermal changes without affecting the backing member 6 after installation.

We claim:

1. A laser mirror including first means having a reflecting surface on one side and a mounting surface on the other side, a mount block for supporting said first means, a mounting pad means for connecting said mounting surface of said first means to said mount block, said mounting pad means having pads thereon, said pads being interconnected to properly locate them in relation to the mounting surface and to accommodate thermal movements between the mounting pad means and first means, said pads having surfaces fixed to the mounting surface, three mounting projections extend from said mounting pad means towards said mount block, said mount block having three seats for receiving the three mounting projections of said mounting pad means, said mount block being formed having two arms for preventing a transfer of excess force between the mount block and said first means, one of said seats for receiving the mounting projections being located adjacent the end of each of the two arms, the third seat being located on the other part of the mount block, each of said mounting projections being positioned in its cooperating seat and attached to said mount block, said two arms being formed to limit the amount of force transmitted between the mount block and the first means.

2. A laser mirror as set forth in claim 1 wherein the two seats on said arms permit them to move relative to the third seat.

3. A laser mirror as set forth in claim 1 wherein the ends of the mounting projections are formed as a portion of a sphere, and the seats for receiving the portion of a sphere of said projections having a surface formed as a portion of a cone to facilitate alignment of the projections with the cooperating seats.

4. A laser mirror as set forth in claim 1 wherein the two arms extend at right angles to each other.

5. A laser mirror as set forth in claim 1 wherein said first means includes a heat exchanger plate means and a backing member, a manifold extending away from each end of said heat exchanger plate means on opposite sides of said backing member, the free ends of the manifolds being connected by rods to prevent a bending moment being placed on said heat exchanger plate means.

6. A laser mirror as set forth in claim 5 wherein said backing member is formed of a vitreous ceramic and said rods are formed of a vitreous ceramic.

7. A laser mirror as set forth in claim 1 wherein said mount block is rectangular in shape, a first and second seat being positioned at adjacent corners of one side of said block, the third seat being formed immediate the ends of the opposite side of said block, said first seat being located adjacent the end of one of said arms, said third seat being located adjacent the end of said other arm, said arms extending at right angles to each other.

* * * * *